UNITED STATES PATENT OFFICE.

WILLIAM B. TATRO, OF HARTFORD, CONNECTICUT.

IMPROVEMENT IN PROCESSES FOR REDUCING NICKEL ORE.

Specification forming part of Letters Patent No. 191,728, dated June 5, 1877; application filed August 31, 1876.

*To all whom it may concern:*

Be it known that I, WILLIAM B. TATRO, of the city and county of Hartford, in the State of Connecticut, have invented a certain new and useful Process for Reducing Nickel Ore, of which the following is a specification:

The subject of my invention is a process by which nickel ore may be reduced much more expeditiously than by the methods now in use.

My invention consists in separating iron and copper or other foreign matter from nickel by the combined effect of chemicals and heat, so applied as to permit the iron, copper, or other foreign matter to be poured off in a fused or liquid state, while the nickel remains in a solid mass at the bottom; or, if smelted in a cupola or other furnace, the nickel may be drawn from the bottom in a fused or liquid state.

In carrying out my invention I first roast or calcine the ore in customary manner, in order to desulphurize it in a measure. I then melt and reduce it to matte with the agency of the following chemicals, to wit: Lime, thirty parts; fluor-spar, thirty parts; saltpeter, twenty-one parts; common salt, ten parts; potash, nine parts, mixed together in about the proportions named, and used in the proportions of about three pecks of the mixture to the ton of ore. The melting of the ore with these chemicals produces the matte. Under the usual process the matte is pulverized and subjected to a tedious and costly treatment with acids to partially remove the iron, copper, &c. Under my improved process I remelt the matte, together with about six quarts of the chemicals before named to the ton of matte. By the combined effect of these chemicals and heat sufficient to fuse the mass the separation is effected of iron, copper, sulphur, and other foreign matter from the nickel, the weight of nickel causing it to settle to the bottom of the crucible or furnace. The heat is then reduced, or the crucible removed from the fire until the nickel has time to chill, which will occur within the space of a few minutes—say five minutes—and can readily be discovered by the observation of the operator. The iron and other foreign matter, being much more fusible, may then be turned off in a liquid state, leaving the nickel in a solid body, ready for refining.

About one-half of the material constituting the matte may be thus discharged or separated from the nickel by this simple and expeditious process, and the separated matter will be found on examination to contain no nickel; or the foreign matters combined with the chemicals, being much lighter than the nickel, may be run off from the top of the latter, and the nickel then tapped out in a melted state. I have carried out the process successfully in both ways.

The iron and copper thus produced may be utilized and worked without difficulty.

While mentioning the chemical ingredients and proportions which I have found in practice to operate with good effect, I do not desire to limit myself to the precise chemicals or proportions named. For example, caustic soda or soda-ash may be substituted for potash. The quantity of flux used and the proportions of ingredients therein are necessarily varied with ores of different character, and all such modifications are within reach of the judgment of the skilled operator who may desire to use my process.

In reducing the matte I sometimes add to the flux one-eighth its bulk of sulphate of ammonia, in order to render the molten mass thinner and assist the separation.

The chemicals make the iron and other foreign matter very thin, and they become much lighter, while the nickel is not affected by them, so the nickel becomes mature and heavier, and settles to the bottom in a liquid state, and may be either allowed to solidify or be tapped out and drawn from the bottom. It is not necessary to cool the mass to effect the separation, as the chemicals do not affect the nickel. It is the heat that does the work on the nickel when it gets to the bottom, away from the other matter, while the chemicals and foreign matter come to the surface. The nickel may be effectually separated from the base metal by making two holes in the furnace, one above the other, and letting the furnace fill with the metals until the baser metal mixed with the flux reaches the upper hole, and there flows off. This process is continued until the nickel reaches the upper hole, and it is then tapped out in a separate state at the lower hole.

Having thus described my invention, the following is what I claim as new and desire to secure by Letters Patent:

1. The process of reducing nickel ore, which consists of melting the ore in contact with a flux consisting of fluor-spar, lime, saltpeter, potash, and common salt, in about the proportions specified, and removing the foreign matters in a molten state, substantially as set forth.

2. The process of reducing nickel matte, consisting in melting the matte in contact with fluor-spar, lime, saltpeter, common salt, and potash, and removing the foreign matter in a melted state, substantially as set forth.

WM. B. TATRO.

Witnesses:
OCTAVIUS KNIGHT,
CHAS. J. GOOCH.